(No Model.)   J. Q. ADAMS.  5 Sheets—Sheet 1.
CORN SHELLER.
No. 587,906.   Patented Aug. 10, 1897.
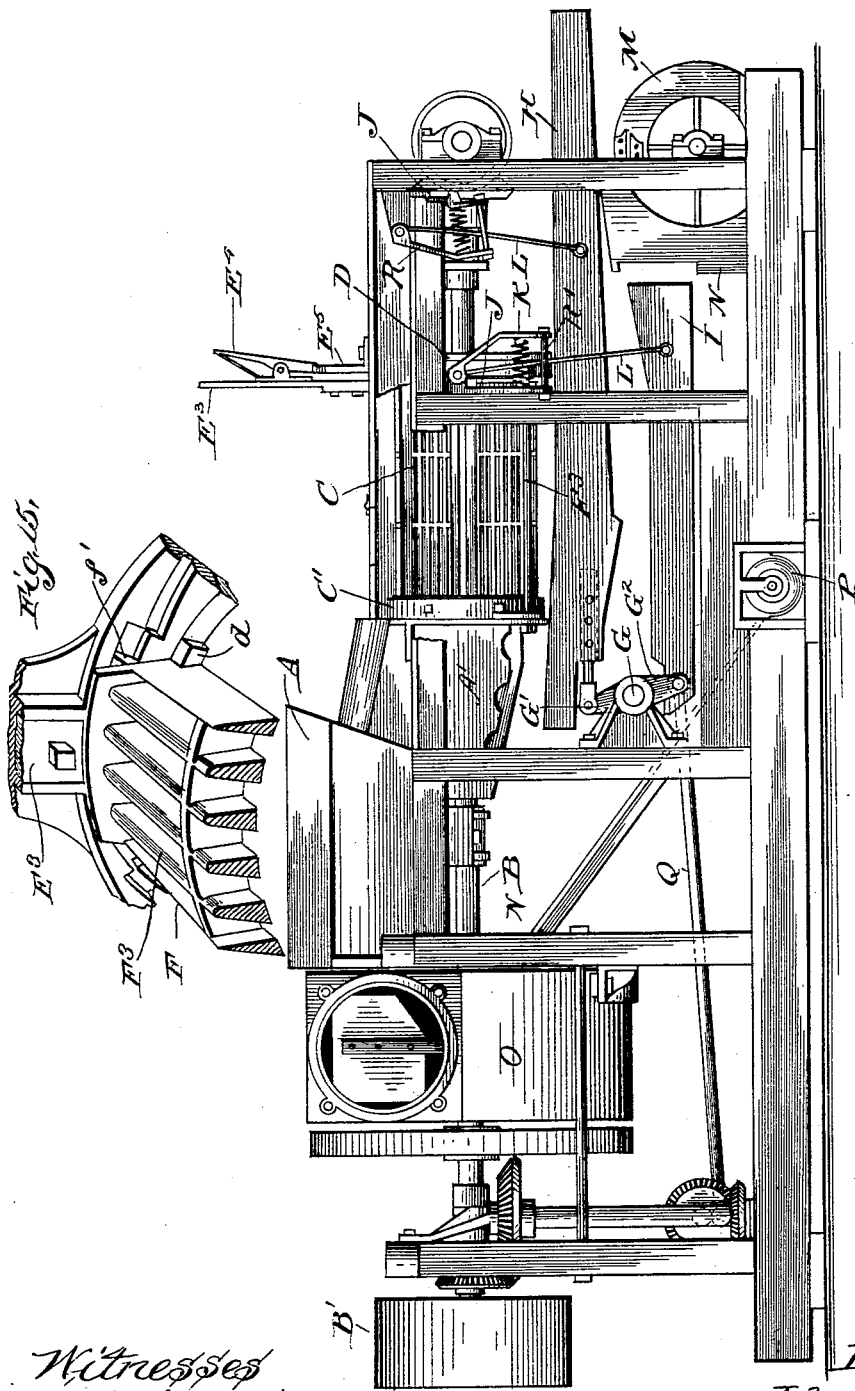
Witnesses
W. C. Corliss
Martin A. Olsen
Inventor
John Q. Adams
by Coburn & Strong
attys

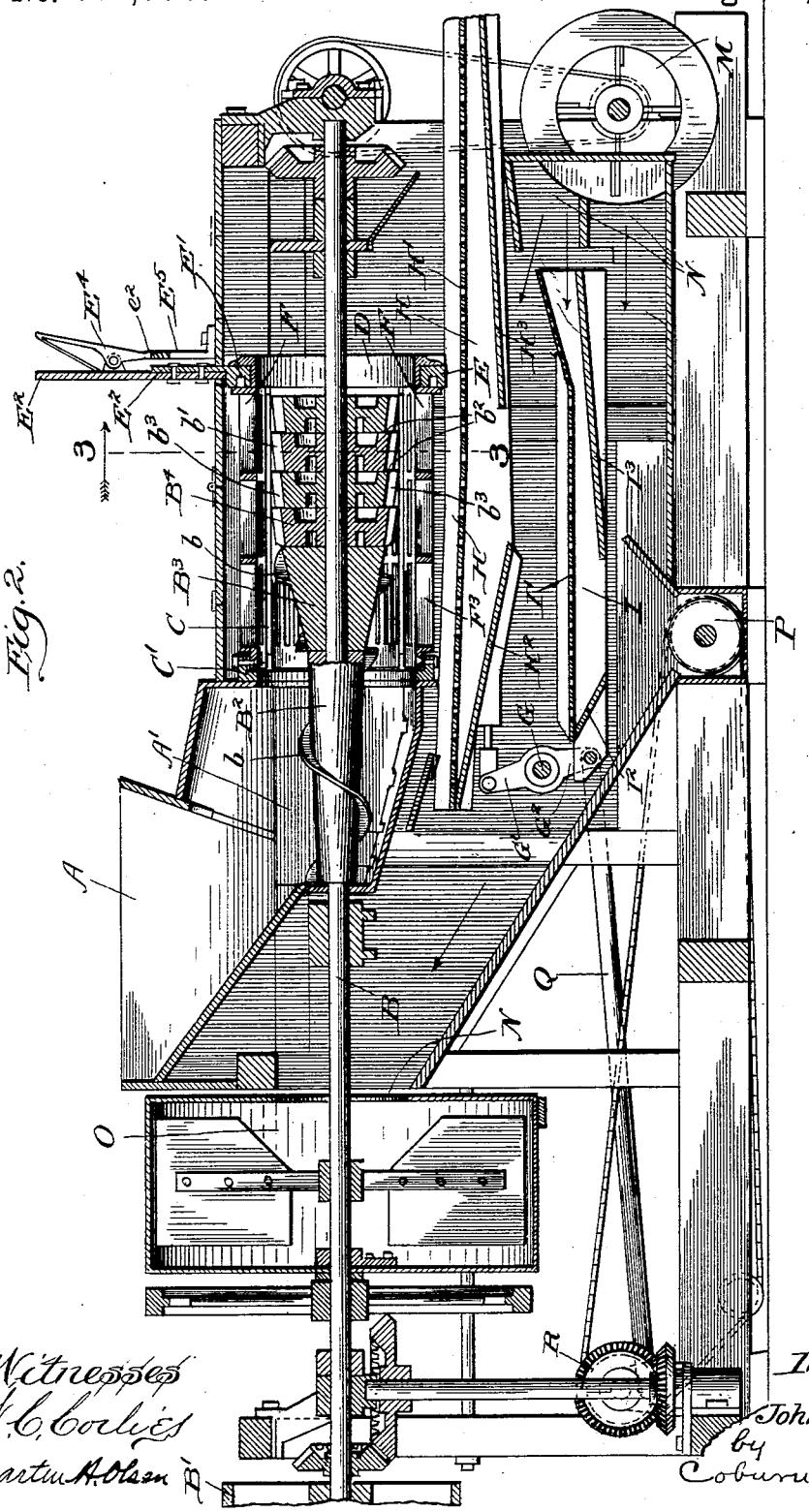

(No Model.) 5 Sheets—Sheet 3.
J. Q. ADAMS.
CORN SHELLER.
No. 587,906. Patented Aug. 10, 1897.
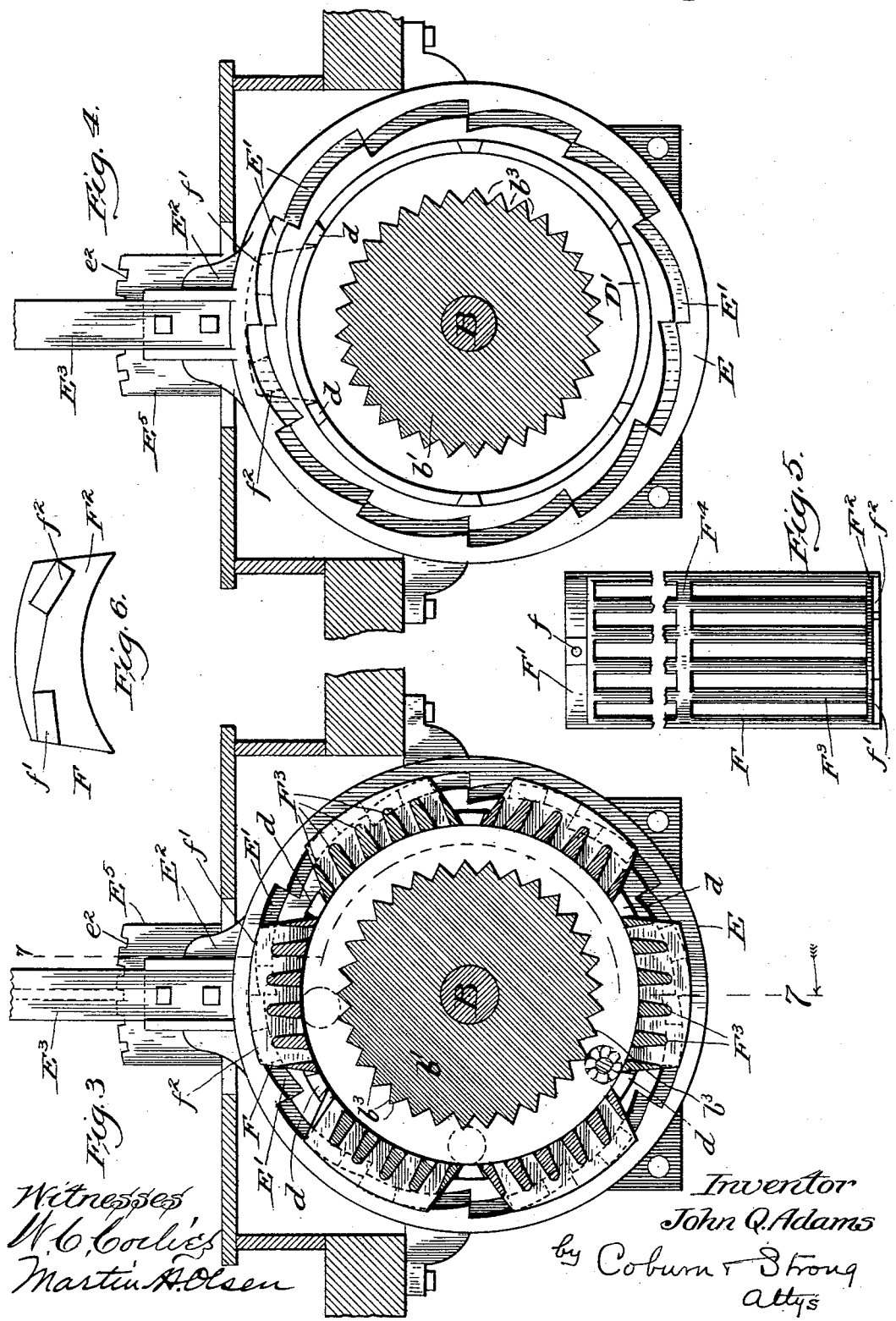
Witnesses
W. C. Coilies
Martin H. Olsen
Inventor
John Q. Adams
by Coburn & Strong
Attys (No Model.) 5 Sheets—Sheet 4.
J. Q. ADAMS.
CORN SHELLER.
No. 587,906. Patented Aug. 10, 1897.
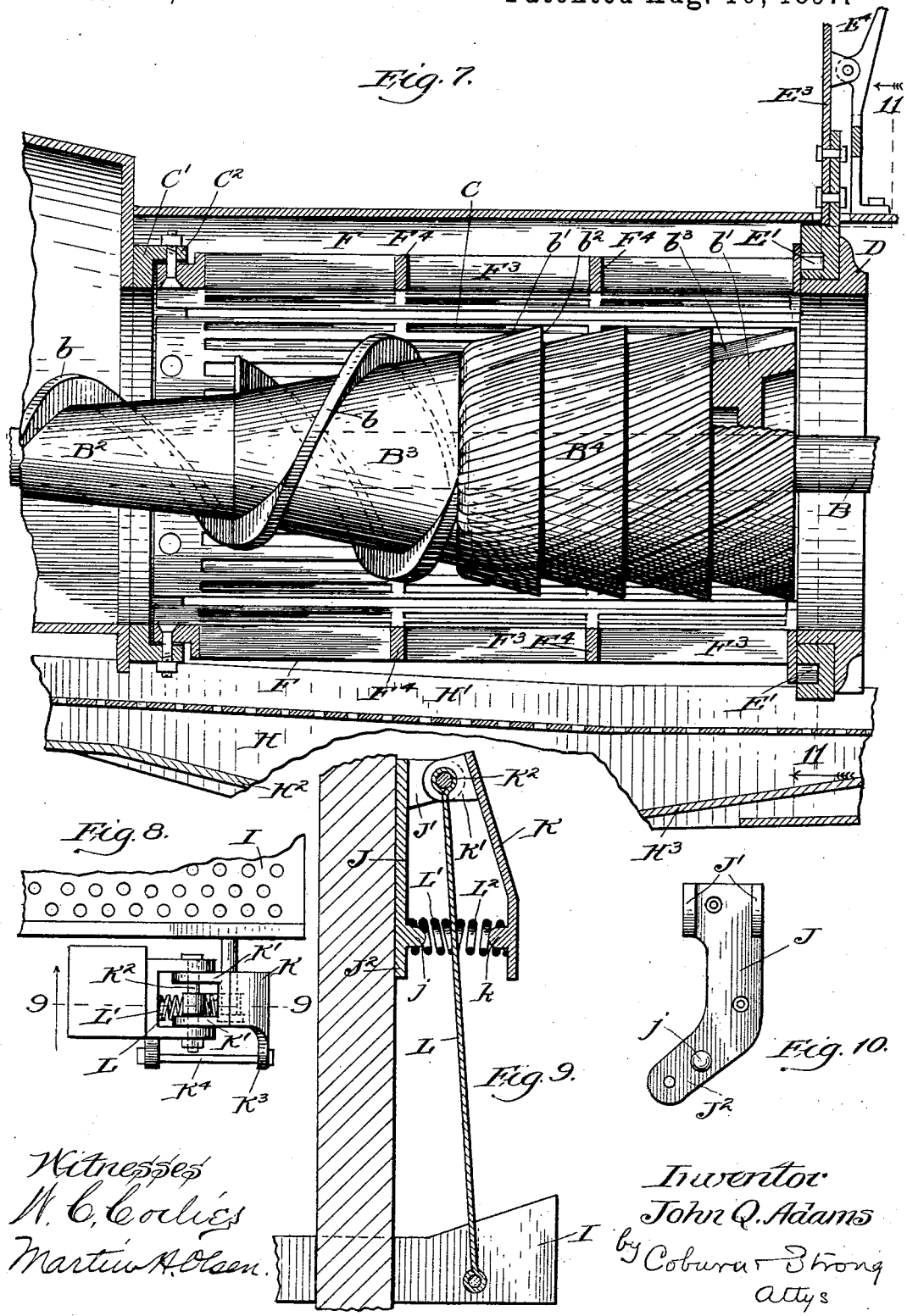
Witnesses
W. C. Coilies
Martin A. Olsen
Inventor
John Q. Adams
by Coburn & Strong
Attys

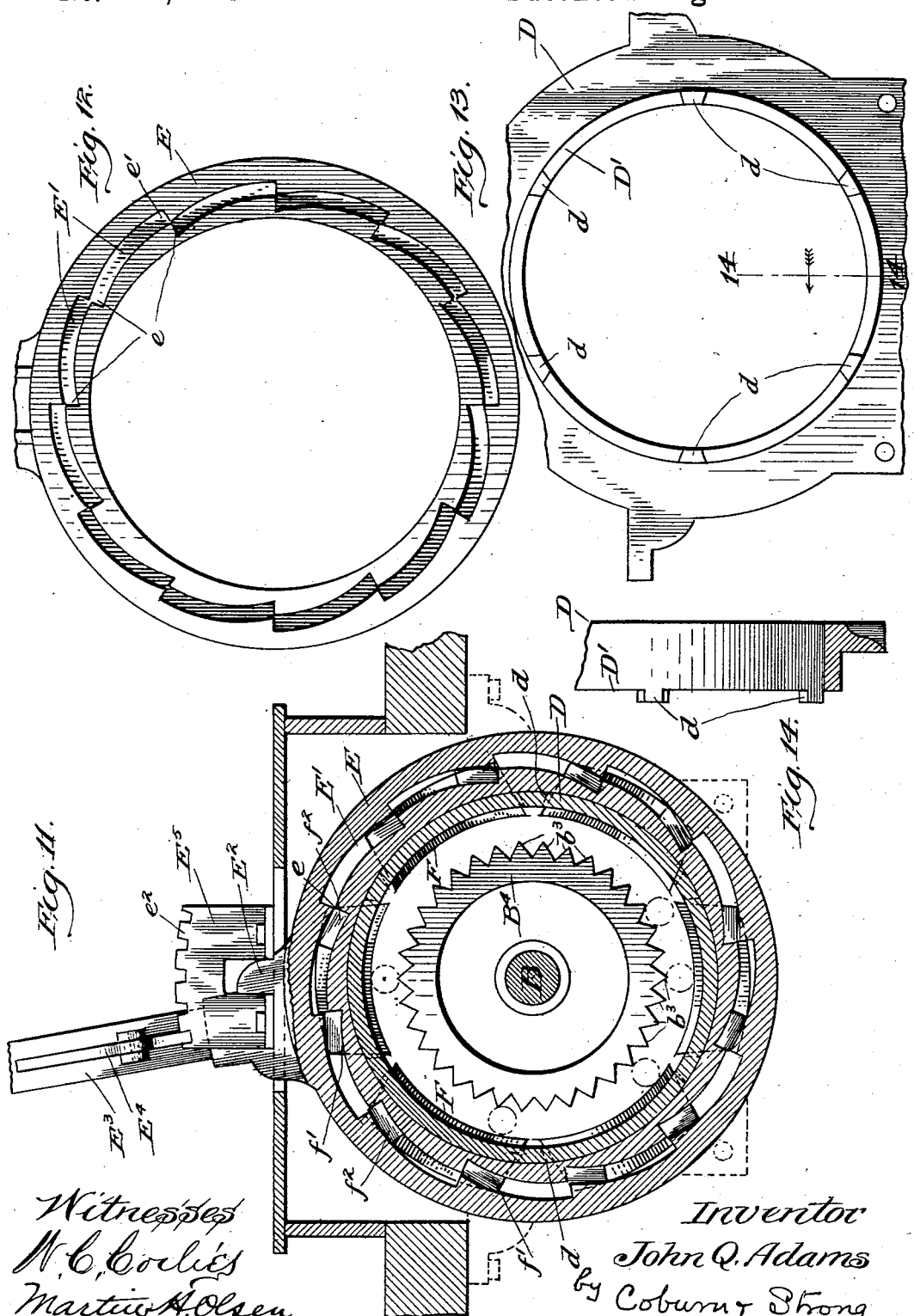

UNITED STATES PATENT OFFICE.

JOHN QUINCY ADAMS, OF MARSEILLES, ILLINOIS.

CORN-SHELLER.

SPECIFICATION forming part of Letters Patent No. 587,906, dated August 10, 1897.

Application filed October 19, 1896. Serial No. 609,302. (No model.)

*To all whom it may concern:*

Be it known that I, JOHN QUINCY ADAMS, a citizen of the United States, residing at Marseilles, in the county of La Salle and State of Illinois, have invented a certain new and useful Improvement in Corn-Shellers, which is fully set forth in the following specification, reference being had to the accompanying drawings, in which—

Figure 1 is a general side elevation of my corn-sheller. Fig. 2 is a vertical longitudinal section approximately along the center thereof. Fig. 3 is a vertical cross-section on the line 3 3 of Fig. 2. Fig. 4 is a similar section with the shelling-cylinder removed. Fig. 5 is a detail plan view of one of the staves composing the shelling-cylinder. Fig. 6 is an end view of such a stave. Fig. 7 is a section on the line 7 7 of Fig. 3. Fig. 8 is a plan view of the spring mechanism supporting each riddle. Fig. 9 is a section on the line 9 9 of Fig. 8. Fig. 10 is a detail of the bracket forming part of this mechanism. Fig. 11 is a vertical cross-section on the line 11 11 of Fig. 7, being a view similar to that in Fig. 3, but taken in the opposite direction. Fig. 12 is an elevation of the adjusting-ring of the cylinder. Fig. 13 is an elevation of a base-ring, upon which the adjusting-ring is mounted. Fig. 14 is a vertical section on the line 14 14 of Fig. 13.

My invention relates to corn-shellers, and has for its object certain improvements in construction designed to add to the efficiency of such a machine. These improvements relate principally to the construction of the shelling-cylinder and to the mounting of the shaking-screens, and will be described in connection with their operation in the machine.

The accompanying drawings illustrate the principal parts of a corn-sheller, as well as those parts especially connected with my invention. Only the latter, however, will be described in detail.

Referring to the drawings by letter, A represents a hopper in which the ears of corn are supplied to the machine.

A' designates the feed-chamber, from which the ears are fed forward to the shelling mechanism proper.

Extending throughout the length of the machine and suitably mounted in the framework thereof, is journaled a shaft B, to which power is applied through the belt-pulley B' at one end thereof.

Within the feed-chamber A' the shaft B carries an enlargement B², around the edge of which extends a spiral flange $b$. This device constitutes, therefore, a screw-feed, forcing the ears of corn into the shelling-cylinder later described. Within the said shelling-cylinder the shaft B carries a still further conical enlargement or hub B³, around which the spiral flange $b$ is continued. Throughout the remainder of the length of the shelling-cylinder there is mounted upon the shaft B the shelling-cone proper, B⁴, consisting of a series of cone-sections $b'$, disposed one behind the other. Each such section is so shaped that its rear edge projects beyond the forward edge of the section next adjacent, forming thereby a series of shoulders $b^2$. These sections of the shelling-cone are provided with spiral V-shaped flanges $b^3$.

The shelling-cylinder C, already referred to and inclosing the shelling-cone, is constructed as follows: There is secured to the framework surrounding the opening from the feed-chamber to the shelling-cylinder a ring C', provided with an outer peripheral flange C². Opposite to this ring and separated from it by the length of the cylinder there is secured to the framework a second or base ring D, provided with an inner peripheral flange D'. Upon this flange are mounted, preferably, six equidistant lugs $d$, tapering inwardly. Upon the base-ring D, surrounding the flange D' and adapted to rotate thereon, is mounted a third or adjusting-ring E. The said adjusting-ring is provided upon its inward-facing surface with a series of segmental slots or grooves E', preferably twelve in number. The said grooves are not concentric with the ring. One end $e$ of each groove or slot is nearer the center of the said ring by a certain determined distance, preferably some five-sixteenths of an inch, than the remaining end of said groove. The adjoining ends of the said grooves are thus somewhat offset in relation to each other.

The adjusting-ring E carries a bracket or projection E², to which there is secured a lever E³, extending upward. This lever is provided with a spring-controlled dog E⁴ of any ordinary construction. Upon the framework of the machine, adjacent to the lever $E^3$, is mounted a segmental rack $E^5$, provided with teeth $e^2$. The dog $E^4$ is adapted to engage with these teeth as the lever is moved one way or the other with relation to the said rack.

The body of the shelling-cylinder is of skeleton construction, and according to my present invention consists of a series of staves F. In the construction illustrated in the drawings I have shown a shelling-cylinder comprising six such staves. Each stave consists of two end pieces $F'$ and $F^2$ and of ribs $F^3$, mounted in and connecting the said end pieces. These end pieces are approximately in the form of segments of a ring. The piece $F'$ is provided with a bolt-hole $f$. The opposite piece $F^2$ carries two lugs $f'$ and $f^2$, shorter than the grooves $E'$ of the ring E, in which grooves the said lugs are adapted to fit and move. When the staves are in position to form the shelling-cylinder, the end piece $F'$ is somewhat loosely secured, by a bolt passing through the bolt-hole $f$, to the flange $C^2$ on the ring $C'$. The two lugs $f'$ and $f^2$, carried by the opposite end piece $F^2$ of the stave, fit in two adjacent grooves $E'$ in the adjusting-ring E. The ribs $F^3$, which form the skeleton of the cylinder, are preferably of the form shown in cross-section in Fig. 3. They are braced apart by the cross-pieces $F^4$. In actual construction the entire stave F, including all the parts described, is preferably made in a single casting.

In the framework of the machine, below the feed-chamber $A'$, is journaled a rock-shaft G, which carries a pair of short upwardly-extending arms $G'$ and of downwardly-extending arms $G^2$. In the arms $G'$ is pivotally mounted one end of a shaking-riddle H, comprising a sieve $H'$ and two deflectors $H^2$ and $H^3$, disposed beneath the same. In the arms $G^2$ is pivotally mounted one end of a second riddle I, comprising a sieve $I'$ and a pair of deflectors $I^2$ and $I^3$.

The remaining end of each of the riddles is spring-mounted in a manner which will now be described with reference to the upper riddle and which is the same with respect to the lower. To the framework of the machine is secured a bracket-casting J, provided with two perforated ears $J'$ and with a downwardly-extending diagonally-disposed arm $J^2$. Upon this arm is formed a lug or projection $j$. A plate-casting K, provided with two perforated ears $K'$, is pivotally secured by a bolt $K^2$, passing through the said ears and through the ears $J'$ to the bracket J. The plate K at its lower end is provided with a lug $k$ opposite and corresponding to the lug $j$, and terminates in a diagonally-disposed arm $K^3$, corresponding to the arm $J^2$. The lower end of the plate K is adjusted nearer to or farther from the bracket J by the bolt $K^4$.

Upon the bolt $K^2$ is pivotally mounted the upper end of a flat spring-hanger L. The lower end of the said hanger is secured to and supports the free end of the riddle I. Upon that portion of the spring-hanger opposite the lug $j$ and the said lug $k$ I place a coiled expansion-spring $L'$. One end of the spring abuts against the hanger L, the other against the bracket J, where it surrounds the lug $j$, by which the said spring is kept in place. A similar spring $L^2$ is placed between the opposite side of the hanger and the lug $k$, carried by the plate K. By tightening the bolt $K^4$ both springs are compressed against the hanger and so against each other, thus increasing their tension.

The remaining parts of the machine shown are of the usual construction. A rotary blower M forces a current of air between the riddles H and I and through the passage N in the direction of the arrow. The dust-collector O, connecting with the passage N, receives this current of air with the dust collected thereby and expels the same from the machine. A screw conveyer P of ordinary form receives the shelled corn from the lower riddle I. The transmission of power to the various parts of the machine is accomplished in any preferred way. The rocking movement is given to the rock-shaft G by the crank-rod Q, one end of which is secured to an arm carried by the rock-shaft, the other to a crank carried by the gear-wheel R, which is connected with the source of power.

I shall now explain the operation of the machine, the construction of which is hereinabove described.

The ears of corn enter the machine by the hopper A and are fed forward by the screw conveyer in the feed-chamber $A'$ to the shelling-cylinder C. By the movement of the conical hub $B^3$ the ears of corn become arranged more or less lengthwise with reference to the cylinder and at the same time are fed forward toward the shelling-cone proper, $B^4$. The flanges upon the cone-sections, in combination with the cylinder, wedge off the kernels from the ears and at the same time feed them forward. The cone-sections are of such relative size that the distance between the perimeter of the last and the inner surface of the cylinder is equal to the diameter of the cob. As the cobs pass out of the right-hand end of the shelling-cylinder, as shown in Figs. 2 and 7, they are completely divested of the kernels of corn.

So far as I am aware in corn-shellers as previously constructed the cylinder C has been always of a fixed diameter. There has been no provision made for expanding or contracting the said cylinder. Accordingly the space between the shelling-cone and the cylinder has also been fixed. Inasmuch as the size of the ears of corn varies considerably a corn-sheller of the usual non-adjustable type must be either so constructed that it will unduly pulverize the cobs of large ears of corn or will imperfectly shell the small ears. If the space between the shelling-cone and the cylinder is of the proper size for large ears, it will be too large for small ears, and vice versa. This important defect I remedy by making the exit end of the shelling-cylinder adjustable in diameter by mechanism already described.

Fig. 7 shows the exit end of the cylinder at its maximum contraction. The lever $E^3$ is thrown over and held by the extreme end of the rack $E^5$. The adjusting-ring E is thereby rotated. The lugs $f'$ and $f^2$ are thereby moved to the inner ends $e$ of the grooves E'. The ends of the staves carrying the said lugs are thereby moved directly inward. All tendency toward rotation on the part of the staves during this movement is prevented by the lugs $d$, carried by the flange D' of the ring D. These lugs abut against the sides of the end pieces $F^2$ of the staves and permit the said ends to move downwardly and inwardly without permitting any lateral movement thereof. The loose bolting of the ends F' of the staves permits this movement of the ends $F^2$.

When the cylinder is at its maximum contraction, as shown in Fig. 11, the adjoining ribs of the adjacent staves are nearly or quite in contact. Accordingly when the cylinder is expanded to its maximum expansion the said adjoining ribs are spaced apart by a distance approximately equal to that between the ribs of each stave. To expand the cylinder from its position, as in Fig. 11, the lever $E^3$ is moved over to any given extent, the ring E is rotated thereby, and the lugs $f'$ and $f^2$ of the staves move from the inner ends $e$ of the slots E' toward the outer ends $e'$ thereof. The inward and outward movement of each stave amounts, preferably, to some five-sixteenths of an inch. This will enable the shelling mechanism to be adapted to ears of any ordinary size.

The shelled corn falling from the cylinder C drops first upon the riddle H, which is vibrated longitudinally by the motion of the rock-shaft G. Passing through the sieve H' the corn is caught by the deflectors $H^2$ and $H^3$ of the said riddle and drops thence on the second riddle I. Passing through the sieve I' thereof it is carried by the deflectors $I^2$ and $I^3$ to the screw conveyer P, which removes the shelled and cleaned corn from the machine.

As already stated, one end of each riddle is pivotally mounted in the arms of the rock-shaft G. The other end is supported by a spring-hanger. As such riddles have been previously constructed the spring-hanger has been rigidly secured at its upper end to the framework of the machine; at its lower end pivotally secured to the end of the riddle. As a result of this construction and of the long-continued vibration of the spring-hanger near the point of the rigid attachment of its upper end, the said hanger is usually crystallized in a short time at such point and soon broken, requiring frequent repairing of the machine in this respect. By my construction the upper end of the hanger is not rigidly but pivotally secured to the framework. By the interposition of the coiled springs L' and $L^2$ when the riddle is at either end of its vibration the entire spring-hanger is curved into the form of an arc of a circle, the bend and tension are distributed along the entire length of the hanger, there is no rigid point in the attachment of the hanger, there is no point at which crystallization can take place, and breakage of the hanger from this cause is entirely avoided. A further advantage of this construction is that the combination of the coiled springs L' and $L^2$ with the spring-hanger forms a mounting for the end of the riddle of the greatest possible elasticity. As has already been seen, the tension of the springs L' and $L^2$ can be increased or decreased at will by the bolt $K^4$.

Having thus described the construction and operation of one of the forms in which my invention may be carried out, I do not wish to be understood as limiting myself thereby to the specific form so described; but

What I claim, and desire to secure by Letters Patent, is—

1. In a corn-shelling machine, the combination of the shelling-cone, with the coöperating cylinder, means for expanding uniformly one end of said cylinder so as to vary the diameter of that end, and connections for holding said cylinder unyieldingly in any desired position of expansion.

2. In a corn-shelling machine, the combination of the shelling-cone, with the coöperating cylinder composed of staves arranged substantially parallel to the axis of said cone, and means of simultaneously moving said staves at one end radially to the cone and retaining them unyieldingly in the position to which they have been moved.

3. In a corn-shelling machine, the combination of the corrugated shelling-cone, with the coöperating cylinder composed of skeleton staves arranged substantially parallel to the axis of said cone, means for simultaneously moving said staves at one end radially to the cone, and connections for retaining them unyieldingly in the position to which they have been adjusted.

4. In a corn-sheller, a shelling-cone; a shelling-cylinder within which the said cone revolves, comprising a series of skeleton staves forming a complete cylinder; means for holding the staves approximately fixed at one end; and a single mechanism adapted to adjust simultaneously all the said staves at their other end radially to and from the center of the cylinder.

5. In a corn-sheller shelling-cylinder, the ring E rotatably mounted at one end of the shelling-cylinder; the staves F each provided at one end with devices adapted to engage with the said ring E; means for holding approximately fixed the opposite ends of the said staves; and mechanism adapted to rotate the ring E.

6. In a corn-sheller, the ring C'; the staves F loosely secured at one end thereof, and provided at their opposite ends with the lugs $f'$;

the ring E rotatably mounted at the opposite end of the shelling-cylinder, and provided with the grooves E' adapted to receive the lugs $f$; and means for rotating the ring E.

7. In a corn-sheller, the ring C'; the skeleton staves F comprising the ribs F³; means for securing the said staves loosely at one end to the ring C'; the lugs $f'$ and $f^2$ mounted upon the opposite free end of the said staves; the base-ring B provided with the flange D' and the lug $d$; the adjusting-ring E, provided with the grooves E' adapted to receive the lugs $f'$ and $f^2$; and means for rotating the said adjusting-ring, and for holding it in such rotated position, substantially as described.

8. In a corn-sheller, a riddle or sieve H; means attached to one end thereof adapted to reciprocate the said riddle; a spring-hanger pivotally connected to the framework of the machine supporting the free end of the riddle; and supplemental springs interposed on each side of the said hanger midway thereof between the hanger and the framework of the machine.

9. As a spring-mounting for a shaking-sieve or other similar device, a hanger L connected with the said sieve and pivotally connected with the framework of the machine; and supplemental springs interposed between the said hanger midway thereof and the framework of the machine on each side of the said hanger.

10. As a spring-mounting for shaking-sieves, &c., the spring-hanger L pivotally connected with the framework of the machine; and the coiled expansion-springs L' and L².

11. As a spring-mounting for shaking-sieves, &c., the spring-hanger H pivotally mounted in the framework of the machine; the spring L interposed between the said hanger and the framework of the machine; the pivoted plate H; the spring L² interposed between the hanger and the said pivotal plate; and means for adjusting the free end of the said pivoted plate to and from the framework of the machine to alter the tension of the springs L' and L².

JOHN QUINCY ADAMS.

Witnesses:
G. J. CRAM,
AUGUSTUS ADAMS.